US012612171B2

(12) United States Patent
Gormley

(10) Patent No.: US 12,612,171 B2
(45) Date of Patent: Apr. 28, 2026

(54) MULTI-SYSTEM THRUST REVERSER FOR AIRCRAFT PROPULSION SYSTEM

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/774,428

(22) Filed: Jul. 16, 2024

(65) Prior Publication Data

US 2026/0021897 A1 Jan. 22, 2026

(51) Int. Cl.
| | |
|---|---|
| B64D 29/06 | (2006.01) |
| B64D 27/40 | (2024.01) |
| F02K 1/60 | (2006.01) |

(52) U.S. Cl.
CPC ........... B64D 29/06 (2013.01); B64D 27/402 (2024.01); F02K 1/60 (2013.01)

(58) Field of Classification Search
CPC .................................. B64D 29/06; F02K 1/60
See application file for complete search history.

(56) References Cited

U.S. PATENT DOCUMENTS

| | | | | | |
|---|---|---|---|---|---|
| 3,815,357 | A | * | 6/1974 | Brennan | F02K 1/70 |
| | | | | | 244/76 B |
| 5,097,662 | A | * | 3/1992 | Vieth | F02K 1/70 |
| | | | | | 239/265.29 |
| 8,162,257 | B2 | * | 4/2012 | Teulou | B64D 29/06 |
| | | | | | 244/110 B |
| 9,518,534 | B2 | | 12/2016 | Kusel | |
| 9,784,214 | B2 | | 10/2017 | Gormley | |
| 10,563,615 | B2 | * | 2/2020 | Howarth | F02K 1/72 |
| 10,655,564 | B2 | | 5/2020 | Gormley | |
| 10,794,328 | B2 | | 10/2020 | Gormley | |
| 11,692,509 | B2 | | 7/2023 | Gormley | |
| 11,719,190 | B2 | | 8/2023 | Gormley | |
| 11,835,015 | B2 | | 12/2023 | Gormley | |
| 11,859,578 | B2 | | 1/2024 | Chilukuri | |
| 2015/0056070 | A1 | * | 2/2015 | Lacko | F02K 1/54 |
| | | | | | 415/214.1 |
| 2016/0245232 | A1 | * | 8/2016 | MacKay | F02K 1/72 |
| 2017/0122128 | A1 | * | 5/2017 | Lacko | F01D 25/32 |
| 2020/0011272 | A1 | * | 1/2020 | Gormley | F02K 1/625 |
| 2020/0088134 | A1 | * | 3/2020 | Gormley | F02K 1/72 |
| 2021/0310440 | A1 | * | 10/2021 | Chilukuri | B64D 29/06 |

\* cited by examiner

*Primary Examiner* — Joshua J Michener
*Assistant Examiner* — Cindi M Curry
(74) *Attorney, Agent, or Firm* — Getz Balich LLC

(57) ABSTRACT

A method is provided for accessing an engine core for an aircraft propulsion system. During this method, a first outer structure section of a nacelle is uncoupled from a second outer structure section of the nacelle. The second outer structure section is pivoted to an open position. A first inner structure section of the nacelle is uncoupled from a second inner structure section of the nacelle. The second inner structure section is pivoted to an open position. The first outer structure section and the first inner structure section are pivoted to an open position while the first inner structure section is structurally linked to the first outer structure section.

16 Claims, 9 Drawing Sheets

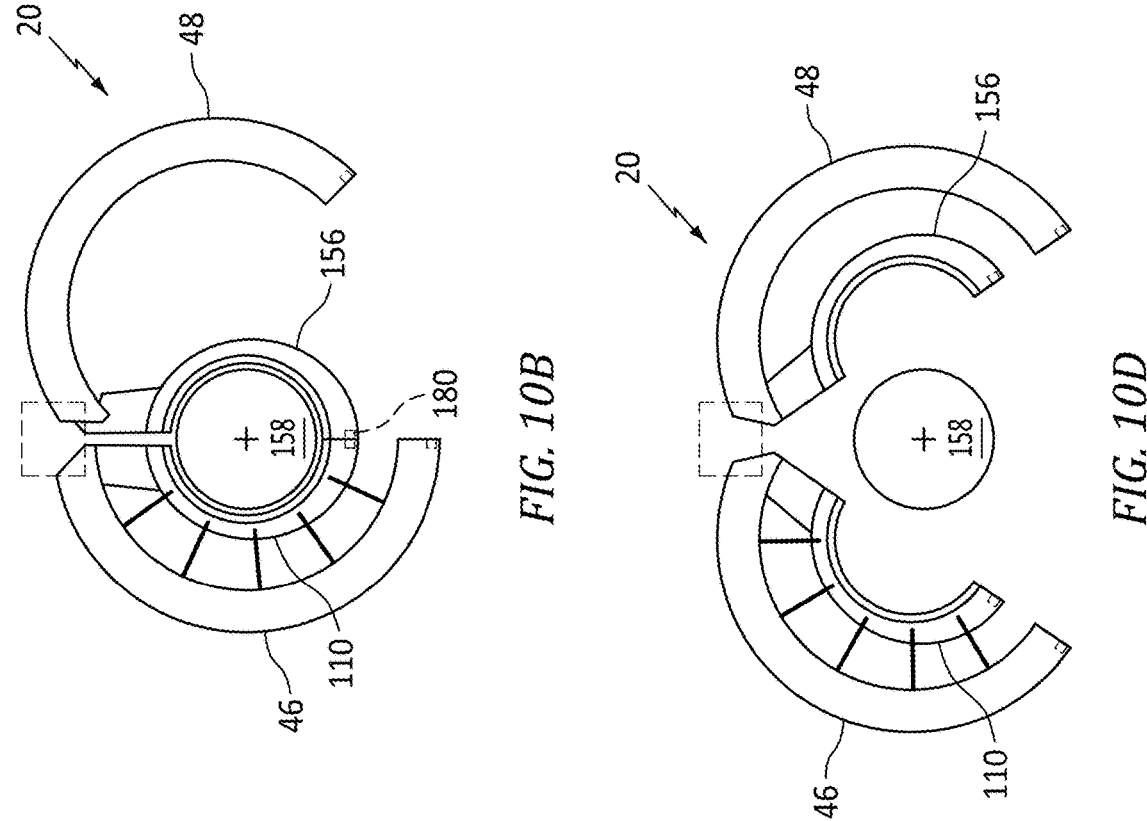
*FIG. 10B*
*FIG. 10A*
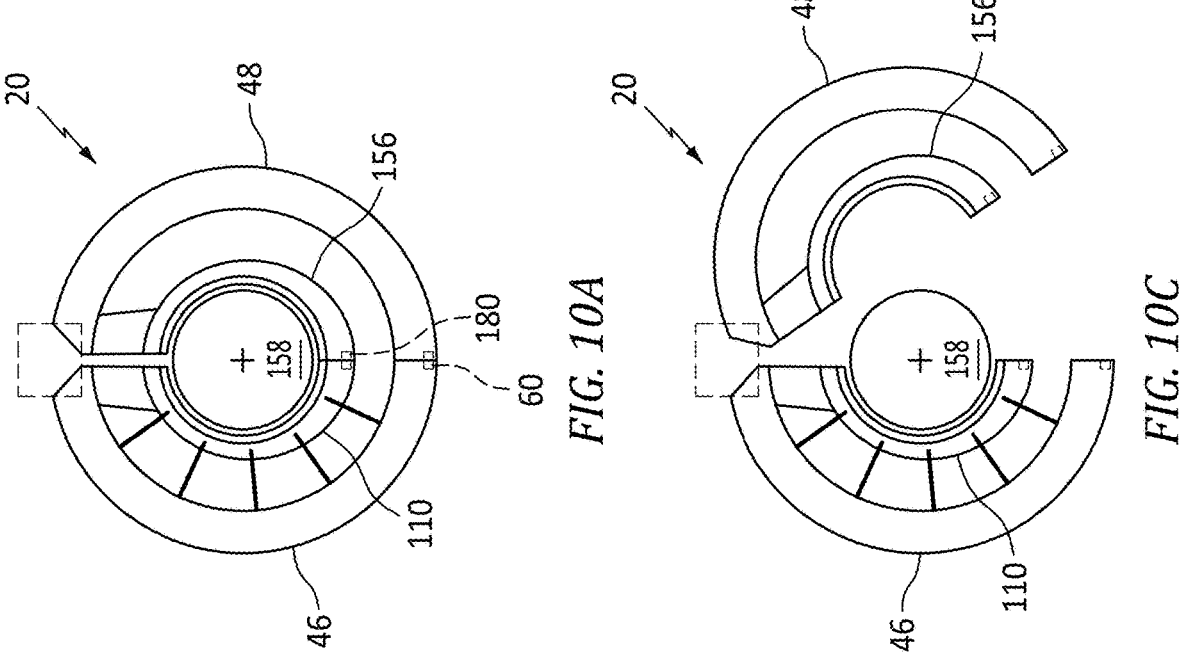
*FIG. 10D*
*FIG. 10C*

MULTI-SYSTEM THRUST REVERSER FOR AIRCRAFT PROPULSION SYSTEM

BACKGROUND

1. Technical Field

This disclosure relates generally to an aircraft propulsion system and, more particularly, to a thrust reverser for an aircraft propulsion system.

2. Background Information

An aircraft propulsion system may include a thrust reverser to aid in aircraft landing. Various types and configurations of thrust reversers are known in the art. While these known thrust reversers have various benefits, there is still room in the art for improvement.

SUMMARY OF THE DISCLOSURE

According to an aspect of the present disclosure, an assembly is provided for an aircraft propulsion system. This assembly includes a first thrust reverser system and a second thrust reverser system. The first thrust reverser system includes a first thrust reverser passage, a first blocker door and a first door deployment linkage pivotally coupled to the first blocker door. The first thrust reverser system is configured to move the first blocker door from a first door stowed position to a first door deployed position using the first door deployment linkage. The first blocker door is located radially outboard of a flowpath relative to an axis when the first blocker door is in the first door stowed position. The first blocker door is configured to redirect a first portion of air flowing in the flowpath through the first thrust reverser passage when the first blocker door is in the first door deployed position. The second thrust reverser system includes a second thrust reverser passage, a second blocker door and a second door deployment linkage pivotally coupled to the second blocker door. The second thrust reverser system is configured to move the second blocker door from a second door stowed position to a second door deployed position using the second door deployment linkage. The second blocker door is located radially outboard of the flowpath relative to the axis when the second blocker door is in the second door stowed position. The second blocker door is configured to redirect a second portion of the air flowing in the flowpath through the second thrust reverser passage when the second blocker door is in the second door deployed position. The second door deployment linkage has a different configuration than the first door deployment linkage.

According to another aspect of the present disclosure, another assembly is provided for an aircraft propulsion system. This assembly includes a stationary structure, a nacelle outer structure and a nacelle inner structure. The nacelle outer structure includes a first outer structure section and a second outer structure section. The first outer structure section is disposed to a first side of the stationary structure and pivotally coupled to the stationary structure. The first outer structure section is configured with a first thrust reverser system. The second outer structure section is disposed to a second side of the stationary structure and pivotally coupled to the stationary structure. The second outer structure section is configured with a second thrust reverser system. The nacelle inner structure includes a first inner structure section and a second inner structure section.

The first inner structure section is disposed to the first side of the stationary structure and pivotally coupled to the stationary structure. The first inner structure section is linked to the first outer structure section by the first thrust reverser system. The second inner structure section is disposed to the second side of the stationary structure and pivotally coupled to the stationary structure. The second inner structure section is decoupled from the second thrust reverser system.

According to still another aspect of the present disclosure, a method is provided for accessing an engine core for an aircraft propulsion system. During this method, a first outer structure section of a nacelle is uncoupled from a second outer structure section of the nacelle. The second outer structure section is pivoted to an open position. A first inner structure section of the nacelle is uncoupled from a second inner structure section of the nacelle. The second inner structure section is pivoted to an open position. The first outer structure section and the first inner structure section are pivoted to an open position while the first inner structure section is structurally linked to the first outer structure section.

The first outer structure section may be configured with a first thrust reverser system that is linked to the first inner structure section. The second outer structure section may be configured with a second thrust reverser system that is decoupled from the second inner structure section.

The second blocker door may be circumferentially offset from the first blocker door about the axis. The second blocker door may be axially aligned with the first blocker door along the axis.

The first thrust reverser system may be configured as an exposed link thrust reverser system. The second thrust reverser system may be configured as a hidden link thrust reverser system.

The first door deployment linkage may extend radially across the flowpath when the first blocker door is in the first door stowed position.

The first door deployment linkage may also be pivotally coupled to a fixed structure radially inboard of the flowpath relative to the axis.

The first blocker door may form an outer peripheral boundary of a portion of the flowpath when the first blocker door is in the first door stowed position.

The first door deployment linkage may be pivotally coupled to the first blocker door at a first pivot point that moves along the axis as the first blocker door moves from the first door stowed position to the first door deployed position. A second pivot point of the first door deployment linkage may be stationary as the first blocker door moves from the first door stowed position to the first door deployed position.

The first door deployment linkage may be/only include a single link.

The second door deployment linkage may be disposed outside of the flowpath when the second blocker door is in the second door stowed position.

The second door deployment linkage may also be pivotally coupled to a fixed structure radially outboard of the flowpath relative to the axis.

The second blocker door may form an outer peripheral boundary of a portion of the flowpath when the second blocker door is in the second door stowed position.

The second door deployment linkage may be pivotally coupled to the second blocker door at a first pivot point that moves along the axis as the second blocker door moves from the second door stowed position to the second door deployed position. A second pivot point of the second door deployment linkage may be stationary as the second blocker door moves from the second door stowed position to the second door deployed position.

The second door deployment linkage may include a first link and a second link. The first link may be pivotally coupled to the first blocker door at the first pivot point. The second link may include the second pivot point.

The first link may be pivotally coupled to the second link.

The assembly may also include a stationary structure and a nacelle outer structure. The nacelle outer structure may include a first outer structure section and a second outer structure section. The first outer structure section may be disposed to a first side of the stationary structure and pivotally coupled to the stationary structure. The first outer structure section may be configured with the first thrust reverser system. The second outer structure section may be disposed to a second side of the stationary structure and pivotally coupled to the stationary structure. The second outer structure section may be configured with the second thrust reverser system.

The stationary structure may be configured as or otherwise include a pylon for mounting the aircraft propulsion system to an airframe of an aircraft.

The first outer structure section may extend circumferentially about the axis away from the stationary structure to a first end of the first outer structure section. The second outer structure section may extend circumferentially about the axis away from the stationary structure to a second end of the second outer structure section. The first end of the first outer structure section may be attached to the second end of the second outer structure section by a latch.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 10A-D are schematic end view illustrations of the aircraft propulsion system depicting a sequence for accessing an engine core of the aircraft propulsion system.

DETAILED DESCRIPTION

Figure 1:
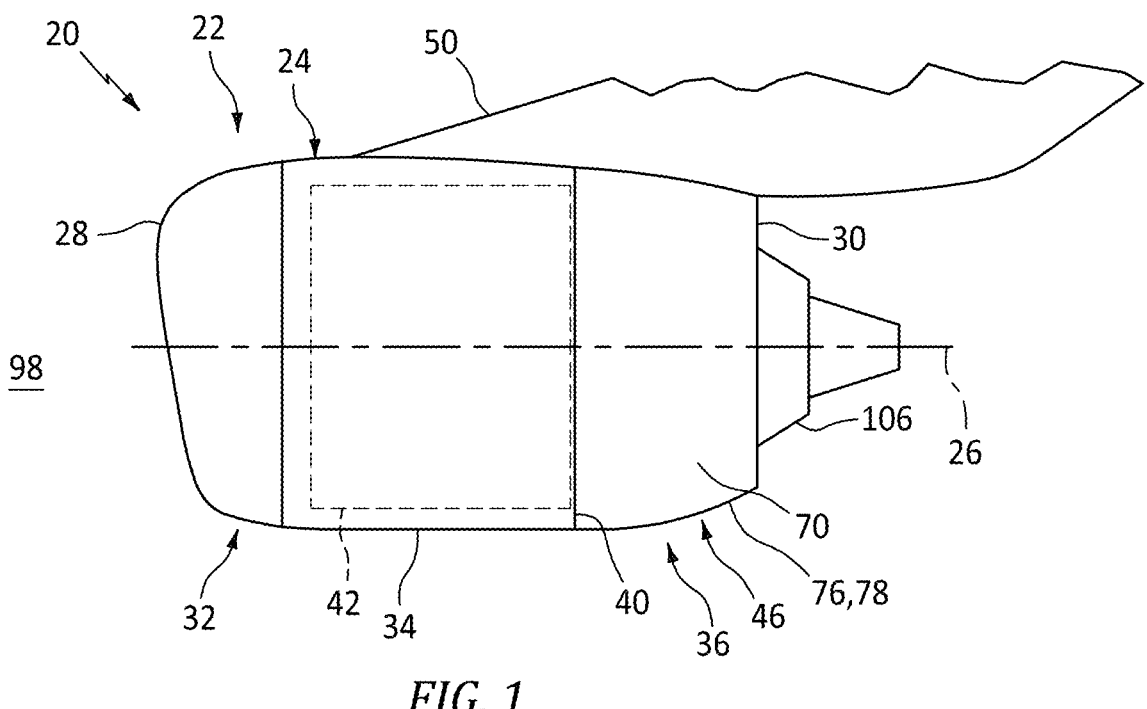
FIG. 1 is a schematic illustration of an aircraft propulsion system with a thrust reverser in a stowed position.

FIG. 1 illustrates an aircraft propulsion system 20 for an aircraft. The aircraft may be an airplane, a drone (e.g., an unmanned aerial vehicle (UAV)) or any other manned or unmanned aerial vehicle or system. The aircraft propulsion system 20 includes a gas turbine engine and a nacelle 22.

The gas turbine engine is configured to power operation of the aircraft propulsion system 20. The gas turbine engine is also configured to produce thrust to propel the aircraft during flight. For ease of description, the gas turbine engine is generally described below as a turbofan engine such as a high-bypass turbofan engine. The present disclosure, however, is not limited to such an exemplary gas turbine engine. Moreover, while the aircraft propulsion system 20 is described as including the gas turbine engine to power operation and produce thrust, it is contemplated the gas turbine engine may be replaced by (or augmented with) one or more propulsor rotors (e.g., fan rotors and/or other air movers) driven by a hybrid-electric power unit or a fully electric power unit.

Figure 2:
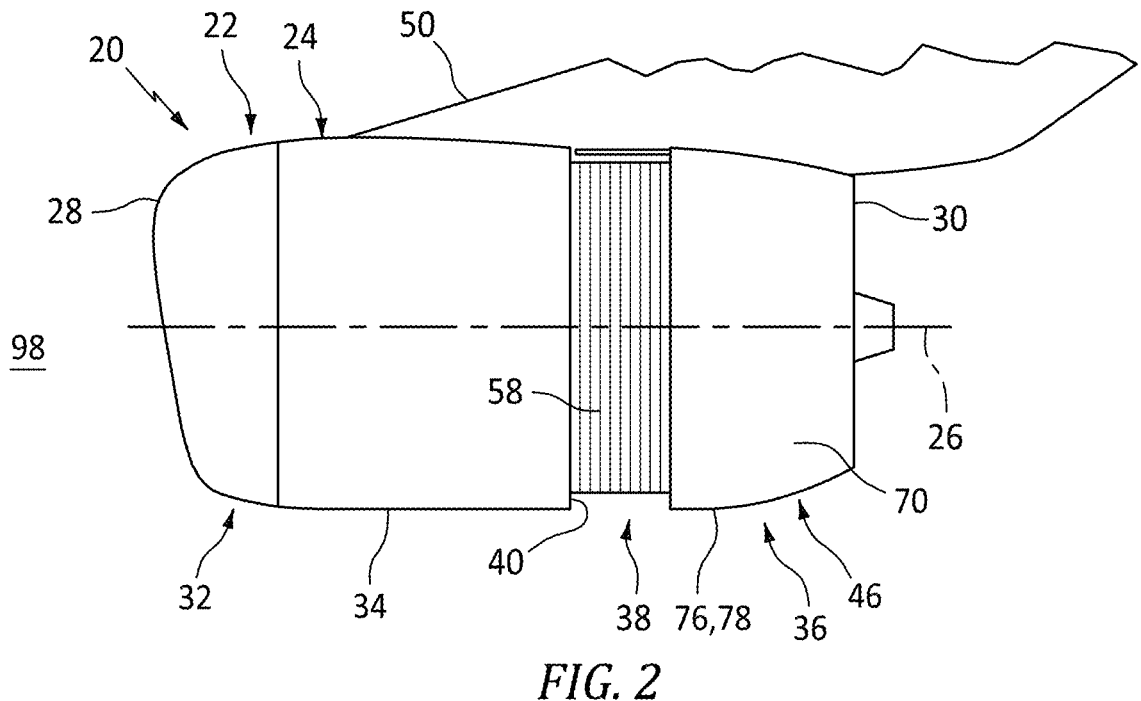
FIG. 2 is a schematic illustration of the aircraft propulsion system with the thrust reverser in a deployed position.

The nacelle 22 is configured to house and provide an aerodynamic cover for the gas turbine engine. An outer structure 24 of the nacelle 22 (e.g., an outer fixed structure (OFS)) extends along a centerline axis 26 from a forward end 28 of the nacelle 22 and its outer structure 24 to an aft end 30 of the nacelle outer structure 24. The nacelle outer structure 24 of FIG. 1 includes an inlet structure 32, one or more fan cowls 34 (one such fan cowl visible in FIG. 1) and an aft structure 36, which aft structure 36 is configured as part of or otherwise includes a thrust reverser 38 (see FIG. 2).

The inlet structure 32 is disposed at the nacelle forward end 28. The inlet structure 32 is configured to direct a stream of air through an inlet opening at the nacelle forward end 28 and into a fan section of the gas turbine engine.

The fan cowls 34 are disposed axially between the inlet structure 32 and the aft structure 36. Each fan cowl 34 of FIG. 1, for example, is disposed at (e.g., on, adjacent or proximate) an aft end 40 of a stationary portion of the nacelle 22, and extends axially forward to the inlet structure 32. Each fan cowl 34 is generally axially aligned with the fan section of the gas turbine engine. The fan cowls 34 are configured to provide an aerodynamic covering over a fan case 42 for the fan section. Briefly, this fan case 42 circumscribes a fan rotor in the fan section and may partially form a forward outer peripheral boundary of a bypass flowpath 44 (see FIG. 3) of the aircraft propulsion system 20.

The term "stationary portion" is used above to describe a portion of the nacelle 22 that is stationary during aircraft propulsion system operation (e.g., during takeoff, aircraft flight and landing). However, the stationary portion may be otherwise movable for aircraft propulsion system inspection/maintenance; e.g., when the aircraft propulsion system 20 is non-operational. Each of the fan cowls 34, for example, may be configured to provide access to components of the gas turbine engine such as the fan case 42 and/or peripheral equipment configured therewith for inspection, maintenance and/or otherwise. In particular, each fan cowl 34 may be pivotally mounted with the aircraft propulsion system 20 by, for example, a pivoting hinge system. Alternatively, the fan cowls 34 and the inlet structure 32 may be configured into a single axially translatable body for example. The present disclosure, of course, is not limited to the foregoing fan cowl configurations and/or access schemes.

Figure 3:
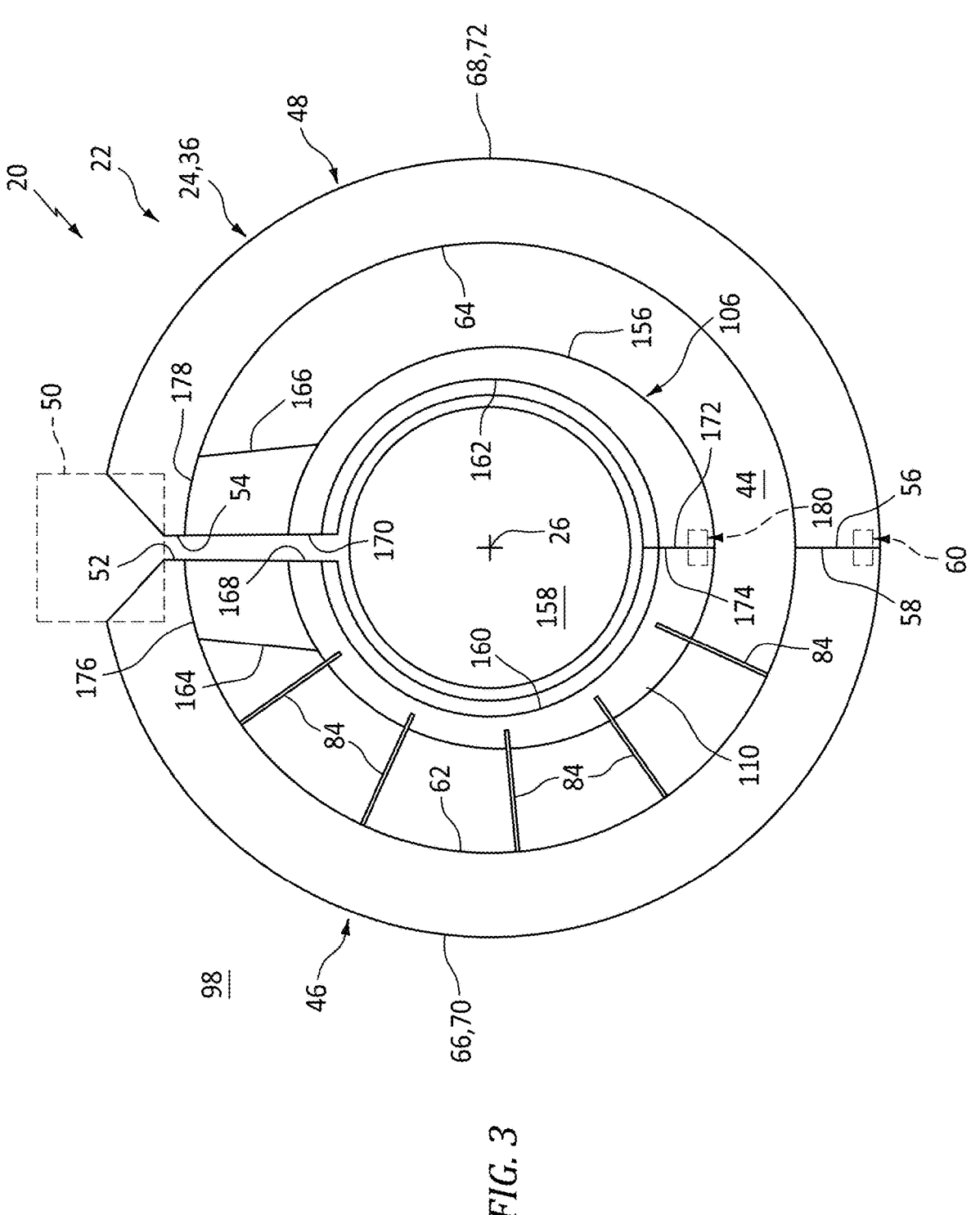
FIG. 3 is a schematic end view illustration of the aircraft propulsion system with the thrust reverser in the stowed position.

Referring to FIG. 3, the aft structure 36 includes a set of outer structure sections 46 and 48; e.g., thrust reverser halves. These outer structure sections 46 and 48 are arranged on opposing sides of the aircraft propulsion system 20. More particularly, the outer structure sections 46 and 48 are arranged to opposing sides of a stationary structure 50 such as a pylon structure for mounting the aircraft propulsion system 20 to an airframe of the aircraft.

Figure 4:
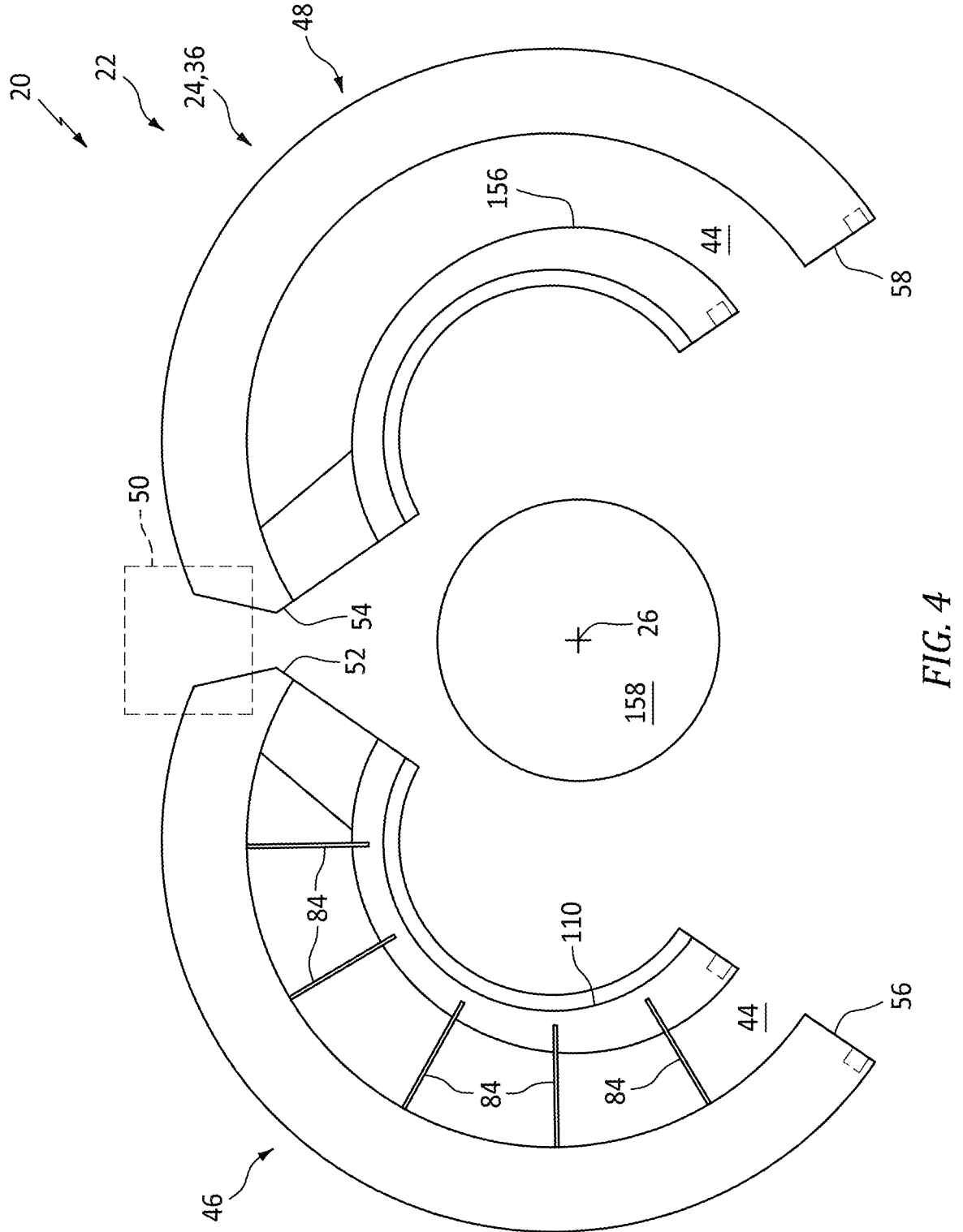
FIG. 4 is a schematic end view illustration of the aircraft propulsion system with its outer structure sections in open positions.

Each of the outer structure sections 46, 48 extends circumferentially about the axis 26 from a circumferential first end 52, 54 (e.g., a top end) of the respective outer structure section 46, 48 to a circumferential second end 56, 58 (e.g., a bottom end) of the respective outer structure section 46, 48. At the outer structure section first end 52, 54, each outer structure section 46, 48 may be pivotally and/or otherwise moveably coupled to the stationary structure 50. At the outer structure section second ends 56, 58, the first outer structure section 46 may be attached to the second outer structure section 48 by one or more outer latches 60. With this arrangement, the outer structure sections 46 and 48 may collectively form a substantially annular body when the outer structure sections 46 and 48 are disposed in closed positions and attached together by the outer latches 60. Here, the annular outer structure body may extend circumferentially about the axis 26 at least, for example, three-hundred and thirty degrees (330°) or three-hundred and forty degrees (340°) between and to opposing sides of the stationary structure 50. However, when the outer latches 60 are unlatched to decouple the outer structure sections 46 and 48, each of the outer structure sections 46, 48 may (e.g., independently) pivot and/or otherwise move from its closed position to an open position as shown, for example, in FIG. 4.

Each of the outer structure sections 46, 48 of FIG. 3 extends radially from a radial inner side 62, 64 of the respective outer structure section 46, 48 to a radial outer side 66, 68 of the respective outer structure section 46, 48. Each outer structure section inner side 62, 64 of FIG. 3 forms a radial outer peripheral boundary of a respective portion (e.g., downstream half) of the bypass flowpath 44. Each outer structure section outer side 66, 68 of FIG. 3 forms an aerodynamic exterior surface 70, 72 of the aircraft propulsion system 20 which is exposed to the ambient air outside of the aircraft propulsion system 20.

Referring to FIG. 1, each of the outer structure sections (e.g., see section 46) extends axially along the axis 26 from a forward, upstream end of the respective outer structure section 46, 48 to the outer structure aft end 30. Similarly, each exterior surface (e.g., see surface 70) extends axially along the axis 26 from a forward, upstream end of the exterior surface to the outer structure aft end 30. Here, the exterior surface upstream end is axially next to the aft end 40 of the stationary portion of the nacelle 22/a respective one of the fan cowls 34.

Figure 5:
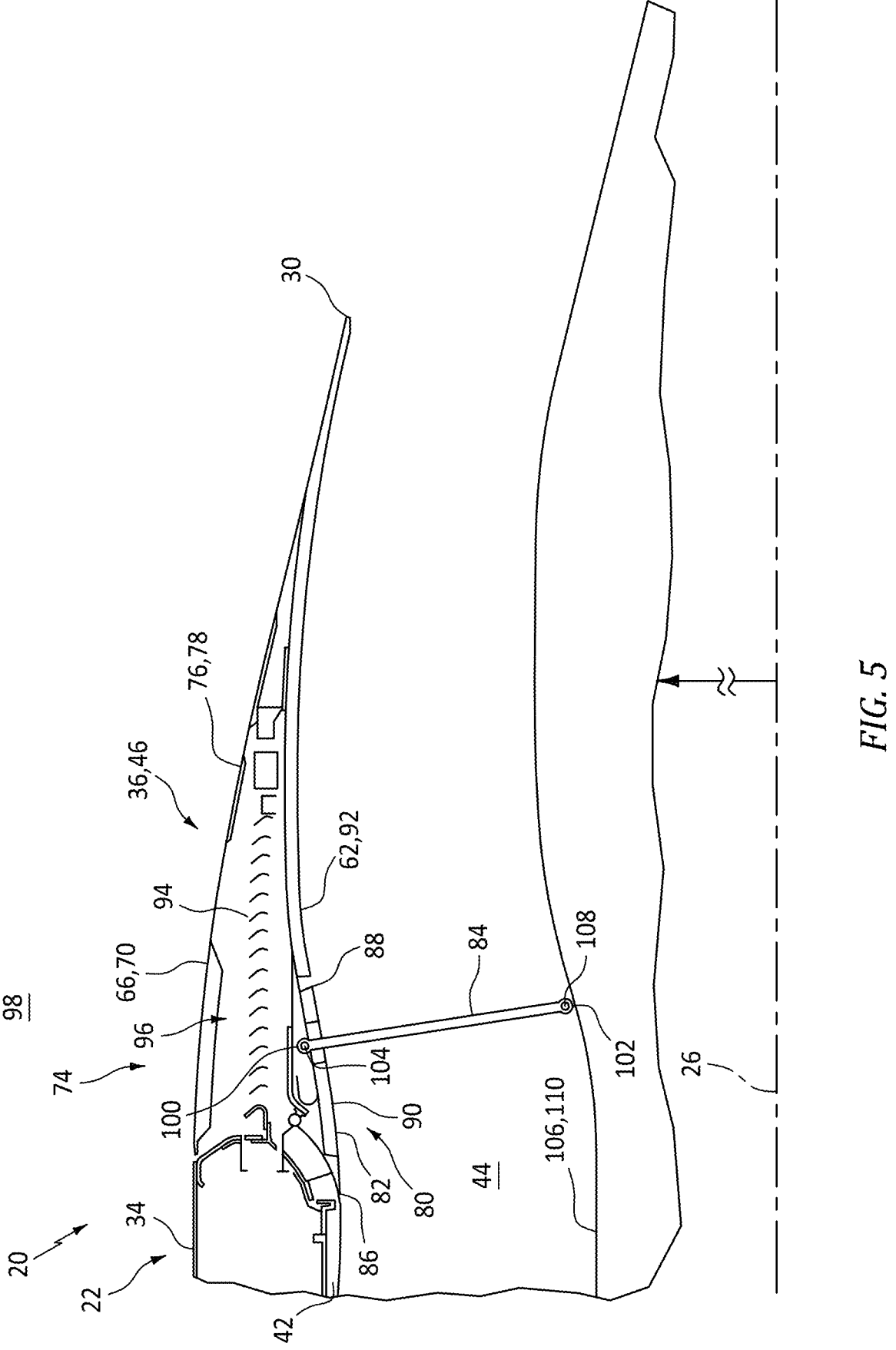
FIG. 5 is a partial schematic illustration of the aircraft propulsion system along a first thrust reverser system in a stowed arrangement.
Figure 6:
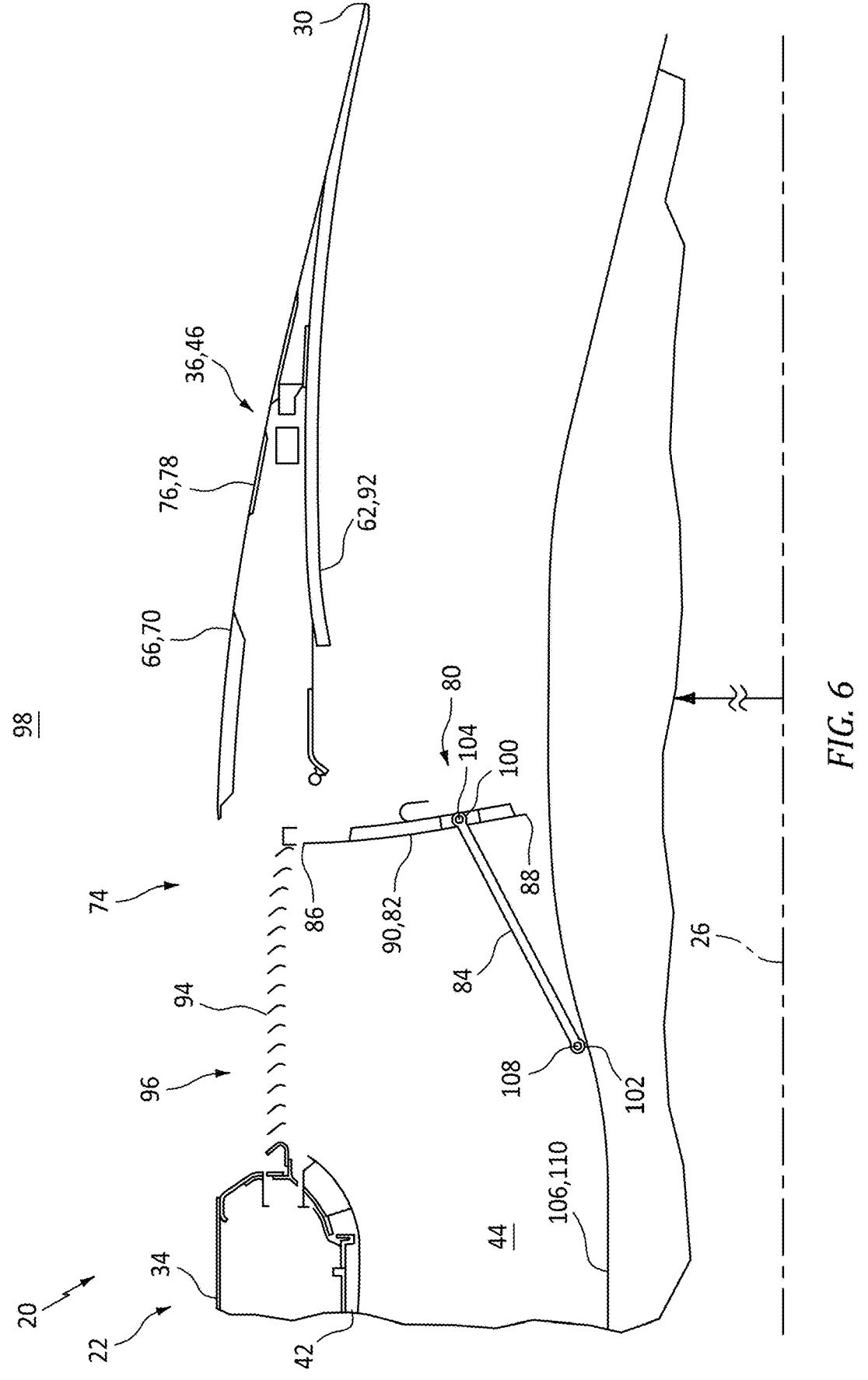
FIG. 6 is a partial schematic illustration of the aircraft propulsion system along the first thrust reverser system in a deployed arrangement.
Figure 7:
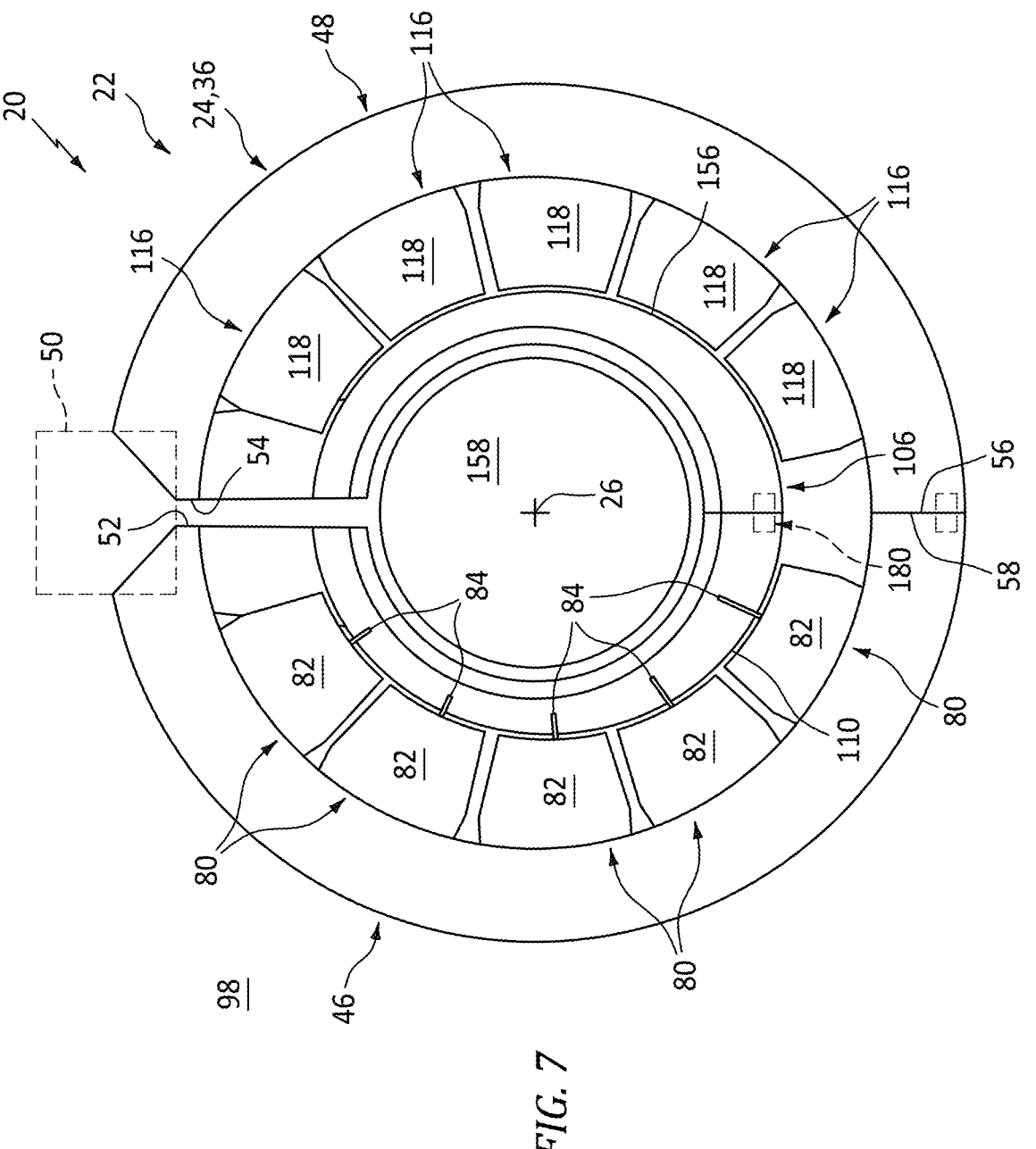
FIG. 7 is a schematic end view illustration of the aircraft propulsion system with the thrust reverser in the deployed position.

Referring to FIGS. 5 and 6, the first outer structure section 46 is configured with a first thrust reverser system 74. This first thrust reverser system 74 includes a first section 76 of a translating sleeve 78. Briefly, the sleeve first section 76 includes/forms the respective exterior surface 70 and is configured to translate axially along the axis 26 between and to a stowed position (see FIG. 5) and a deployed position (see FIG. 6). The first thrust reverser system 74 also includes one or more first blocker door assemblies 80. Referring to FIG. 7, the first blocker door assemblies 80 are arranged circumferentially about the axis 26 in an arcuate array circumferentially between the first outer structure section first end 52 and the first outer structure section second end 56.

Referring to FIGS. 5 and 6, the first thrust reverser system 74 may be configured as an exposed drag link type thrust reverser system. Each first blocker door assembly 80 of FIGS. 5 and 6, for example, includes a first blocker door 82 and at least (or only) one first door deployment linkage 84. Briefly, the first door deployment linkage 84 is configured to actuate pivoting and/or other movement of the first blocker door 82 between and to a stowed position (see FIG. 5) and a deployed position (see FIG. 6).

The first blocker door 82 extends longitudinally between and to a first end 86 of the first blocker door 82 and a second end 88 of the first blocker door 82. This first blocker door 82 is pivotally coupled to the sleeve first section 76 at or near the first door first end 86. With this arrangement, the first blocker door 82 is configured to pivot and/or otherwise move between its stowed position of FIG. 5 and its deployed position of FIG. 6.

When the first blocker door 82 is in its stowed position of FIG. 5, the first door first end 86 is a forward, upstream end of the first blocker door 82 and the first door second end 88 is an aft, downstream end of the first blocker door 82. Here, the first blocker door 82 is disposed outside of (e.g., next to and radially outboard of) the bypass flowpath 44. A side surface 90 of the first blocker door 82 of FIG. 5, for example, forms a radial outer peripheral boundary of a respective portion of the bypass flowpath 44. This door side surface 90 may also be arranged flush with a radial inner surface 92 of the sleeve first section 76.

When the first blocker door 82 is in its deployed position of FIG. 6, the first door first end 86 is a radial outer end of the first blocker door 82 and the first door second end 88 is a radial inner end of the first blocker door 82. Here, the first blocker door 82 is disposed in the bypass flowpath 44. The first blocker door 82 of FIG. 6, for example, projects radially inward (e.g., towards the axis 26) into and substantially across the bypass flowpath 44. With this arrangement, the first blocker door 82 and its side surface 90 are configured to block off a downstream portion of the bypass flowpath 44 and redirect air flowing in an upstream portion of the bypass flowpath 44 radially outward to flow through the first outer structure section 46. Briefly, the downstream portion of the bypass flowpath 44 is a portion of the bypass flowpath 44 downstream of the deployed first blocker door 82, and the upstream portion of the bypass flowpath 44 is a portion of the bypass flowpath 44 upstream of the deployed first blocker door 82. The air redirected by the first blocker door 82 flows radially outward (e.g., away from the axis 26) through a first cascade structure 94 and a first thrust reverser passage 96 into an environment 98 external to the aircraft propulsion system 20. The first cascade structure 94 may further redirect the air flowing therethrough such that the air directed into the external environment 98 by the first thrust reverser system 74 follows a trajectory with an axial forward component to provide reverse thrust.

The first door deployment linkage 84 of FIGS. 5 and 6 is configured as a single drag link. The first door deployment linkage 84 of FIGS. 5 and 6, for example, extends longitudinally from a first end 100 of the first door deployment linkage 84 and its drag link to a second end 102 of the first door deployment linkage 84 and its drag link. The first door deployment linkage 84 is pivotally and/or otherwise movably coupled to the first blocker door 82 at the first linkage first end 100, and at an intermediate location between the first door first end 86 and the first door second end 88. Here, an outer pivot point 104 at the coupling between the first door deployment linkage 84 and the first blocker door 82 is a moveable pivot point in that the location of the outer pivot point 104 moves as the first blocker door 82 moves between its stowed position of FIG. 5 and its deployed position of FIG. 6. The first door deployment linkage 84 is pivotally and/or otherwise movably coupled to an inner structure 106 of the nacelle 22 (e.g., an inner fixed structure (IFS)) at the first linkage second end 102. Here, an inner pivot point 108 at the coupling between the first door deployment linkage 84 and the nacelle inner structure 106 is a stationary pivot point in that the location of the inner pivot point 108 does not move as the first blocker door 82 moves between its stowed position of FIG. 5 and its deployed position of FIG. 6. With this arrangement, the first door deployment linkage 84 extends radially across the bypass flowpath 44 when the first blocker door 82 is in its stowed position. The first door deployment linkage 84 further structurally links the first outer structure section 46 to a first section 110 of the nacelle inner structure 106.

During operation of the first thrust reverser system 74, the first door deployment linkage 84 operatively links the translating movement of the sleeve first section 76 to the pivoting movement of the first blocker door 82. For example, as the sleeve first section 76 translates axially aft from its stowed position of FIG. 5 to its deployed position of FIG. 6, the sleeve first section 76 pulls the outer pivot point 104 axially aft. However, since the inner pivot point 108 is stationary, the first door deployment linkage 84 pulls the first blocker door 82 and its first door second end 88 radially inward into the bypass flowpath 44. This motion may then be reversed when the sleeve first section 76 translates axially forward from its deployed position of FIG. 6 to its stowed position of FIG. 5.

Figure 8:
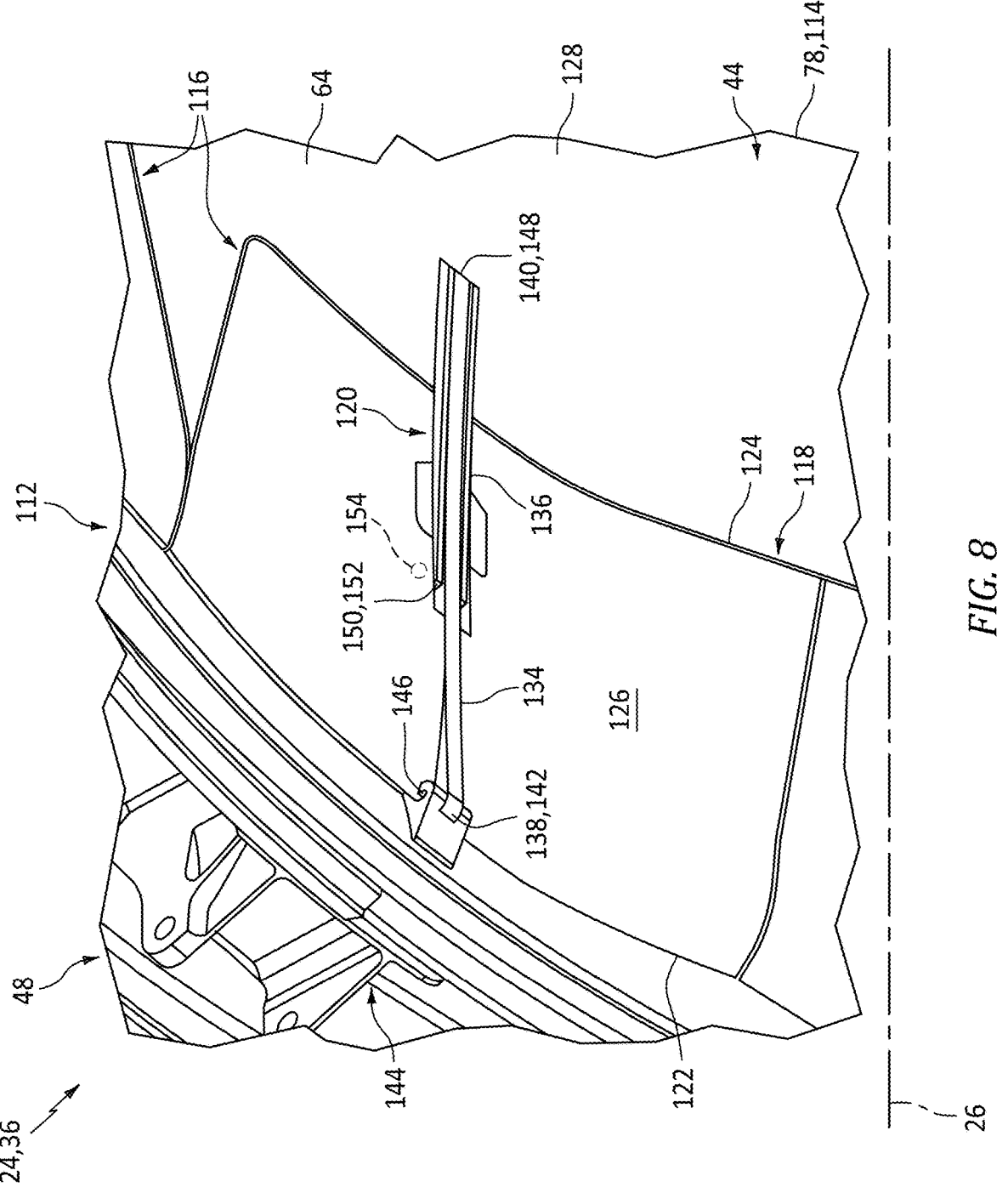
FIG. 8 is a partial perspective illustration of the aircraft propulsion system along a second thrust reverser system in a stowed arrangement.
Figure 9:
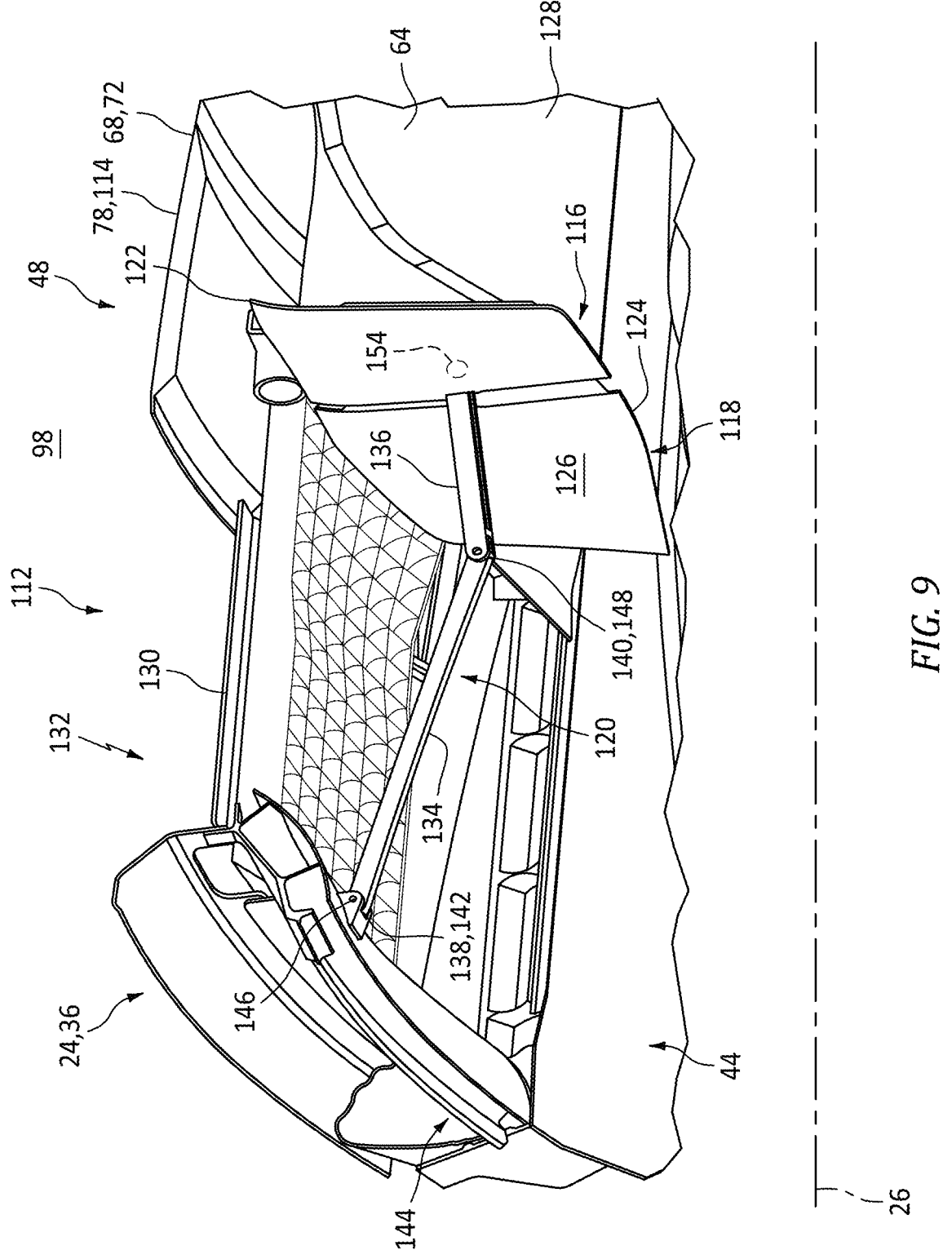
FIG. 9 is a partial perspective illustration of the aircraft propulsion system along the second thrust reverser system in a deployed arrangement.

Referring to FIGS. 8 and 9, the second outer structure section 48 is configured with a second thrust reverser system 112. This second thrust reverser system 112 includes a second section 114 of the translating sleeve 78. Briefly, the sleeve second section 114 includes/forms the respective exterior surface 72 and is configured to translate axially along the axis 26 between and to a stowed position (see FIG. 8) and a deployed position (see FIG. 9). The second thrust reverser system 112 also includes one or more second blocker door assemblies 116. Referring to FIG. 7, the second blocker door assemblies 116 are arranged circumferentially about the axis 26 in an arcuate array circumferentially between the second outer structure section first end 54 and the second outer structure section second end 58.

Referring to FIGS. 8 and 9, the second thrust reverser system 112 may be configured as a hidden link type thrust reverser system. Each second blocker door assembly 116 of FIGS. 8 and 9, for example, includes a second blocker door 118 and at least (or only) one second door deployment linkage 120. Briefly, the second door deployment linkage 120 is configured to actuate pivoting and/or other movement of the second blocker door 118 between and to a stowed position (see FIG. 8) and a deployed position (see FIG. 9).

The second blocker door 118 extends longitudinally between and to a first end 122 of the second blocker door 118 and a second end 124 of the second blocker door 118. This second blocker door 118 is pivotally coupled to the sleeve second section 114 at or near the second door first end 122. With this arrangement, the second blocker door 118 is configured to pivot and/or otherwise move between its stowed position of FIG. 8 and its deployed position of FIG. 9.

When the second blocker door 118 is in its stowed position of FIG. 8, the second door first end 122 is a forward, upstream end of the second blocker door 118 and the second door second end 124 is an aft, downstream end of the second blocker door 118. Here, the second blocker door 118 is disposed outside of (e.g., next to and radially outboard of) the bypass flowpath 44. A side surface 126 of the second blocker door 118 of FIG. 8, for example, forms a radial outer peripheral boundary of a respective portion of the bypass flowpath 44. This door side surface 126 may also be arranged flush with a radial inner surface 128 of the sleeve second section 114.

When the second blocker door 118 is in its deployed position of FIG. 9, the second door first end 122 is a radial outer end of the second blocker door 118 and the second door second end 124 is a radial inner end of the second blocker door 118. Here, the second blocker door 118 is disposed in the bypass flowpath 44. The second blocker door 118 of FIG. 9, for example, projects radially inward into and substantially across the bypass flowpath 44. With this arrangement, the second blocker door 118 and its side surface 126 are configured to block off the downstream portion of the bypass flowpath 44 and redirect air flowing in the upstream portion of the bypass flowpath 44 radially outward to flow through the second outer structure section 48. Referring to FIG. 9, the air redirected by the second blocker door 118 flows radially outward through a second cascade structure 130 and a second thrust reverser passage 132 into the external environment 98. The second cascade structure 130 may further redirect the air flowing therethrough such that the air directed into the external environment 98 by the second thrust reverser system 112 follows a trajectory with an axial forward component to provide reverse thrust.

The second door deployment linkage 120 may include one or more interconnected links. The second door deployment linkage 120 of FIGS. 8 and 9, for example, includes a first link 134 (e.g., a drag link) and a second link 136 (e.g., a door crank). The first link 134 extends longitudinally from a first end 138 of the first link 134 to a second end 140 of the first link 134, where the first link first end 138 may also be a first end 142 of the second door deployment linkage 120. This second linkage first end 142 is pivotally and/or otherwise movably coupled to a fixed structure 144 of the second outer structure section 48; e.g., a bullnose and/or a torque box. Here, an upstream pivot point 146 at the coupling between the second door deployment linkage 120 and its first link 134 and the fixed structure 144 is a stationary pivot point in that the location of the upstream pivot point 146 does not move as the second blocker door 118 moves between its stowed position of FIG. 8 and its deployed position of FIG. 9. The second link 136 extends longitudinally from a first end 148 of the second link 136 to a second end 150 of the second link 136 (see FIG. 8), where the second link second end 150 may also be a second end 152 of the second door deployment linkage 120 (see FIG. 8). This second linkage second end 152 is pivotally and/or otherwise movably coupled to the second blocker door 118 at an intermediate location between the first door first end 122 and the first door second end 124. Here, a downstream pivot point 154 (which is behind the surface 126 in FIGS. 8 and 9) at the coupling between the second door deployment linkage 120 and its second link 136 and the second blocker door 118 is a moveable pivot point in that the location of the downstream pivot point 154 moves as the second blocker door 118 moves between its stowed position of FIG. 8 and its deployed position of FIG. 9. The first link 134 is also pivotally coupled to the second link at the ends 140, 148. With the foregoing arrangement, the second door deployment linkage 120 and its members 134 and 136 may be disposed partially or completely outside of the bypass flowpath 44/radially outboard of the bypass flowpath 44 when the second blocker door 118 is in its stowed position. Thus, by contrast to the first thrust reverser system 74 of FIG. 7, the second thrust reverser system 112 may be structurally decoupled from the nacelle inner structure 106 and, more particularly, a second section 156 of the nacelle inner structure 106 beneath the second outer structure section 48 (see FIGS. 3 and 7).

During operation of the second thrust reverser system 112 of FIGS. 8 and 9, the second door deployment linkage 120 operatively links the translating movement of the sleeve second section 114 to the pivoting movement of the second blocker door 118. For example, as the sleeve second section 114 translates axially aft from its stowed position of FIG. 8 to its deployed position of FIG. 9, the sleeve second section 114 pulls the downstream pivot point 154 axially aft. However, since the upstream pivot point 146 is stationary, the second door deployment linkage 120 pulls the second blocker door 118 and its second door second end 124 radially inward into the bypass flowpath 44. This motion may then be reversed when the sleeve second section 114 translates axially forward from its deployed position of FIG. 9 to its stowed position of FIG. 8.

Referring to FIG. 3, the nacelle inner structure 106 and its members are configured to house a core 158 (e.g., a gas generator) of the gas turbine engine. The nacelle inner structure 106 and its members are configured to form at least a portion (or an entirety) of a radial inner peripheral boundary of the bypass flowpath 44. Referring to FIG. 1, the nacelle inner structure 106 also forms a bypass exhaust from the bypass flowpath 44 with the aft structure 36 and its members 110 and 156 (see also FIG. 3). Referring again to FIG. 3, the nacelle inner structure 106 includes the first inner structure section 110 and the second inner structure section 156. These inner structure sections 110 and 156 are arranged to opposing sides of the stationary structure 50. Each of the inner structure sections 110, 156 includes an inner barrel section 160, 162 and a (e.g., upper) bifurcation section 164, 166.

Each of the inner structure sections 110, 156 and its members 160 and 164, 162 and 166 extends axially along the axis 26 between opposing axial ends thereof. The inner barrel section 160, 162 extends circumferentially about the axis 26 from a circumferential first end 168, 170 (e.g., a top end) of the respective inner barrel section 160, 162 to a circumferential second end 172, 174 (e.g., a bottom end) of the respective inner barrel section 160, 162. At the inner barrel section first end 168, 170, the bifurcation section 164, 166 projects radially out from the respective inner barrel section 160, 162 to a radial outer end 176, 178 of the respective bifurcation section 164, 166. At the bifurcation section outer end 176, 178, the respective inner structure section 110, 156 and its bifurcation section 164, 166 may be pivotally and/or otherwise moveably coupled to the stationary structure 50. At the inner barrel section second ends 172 and 174, the first inner structure section 110 may be attached to the second inner structure section 156 by one or more inner latches 180. With this arrangement, the inner structure sections 110 and 156 and their inner barrel sections 160 and 162 may collectively form a substantially annular body when the inner structure sections 110 and 156 are disposed in closed positions and attached together by the inner latches 180. Here, the annular inner structure body may extend circumferentially about the axis 26 at least, for example, three-hundred and thirty degrees (330°) or three-hundred and forty degrees (340°) between and to opposing sides of a bifurcation. However, when the inner latches 180 are unlatched to decouple the inner structure sections 110 and 156 and their inner barrel sections 160 and 162, each of the inner structure sections 110, 156 may (e.g., independently) pivot and/or otherwise move from its closed position to an open position as shown, for example, in FIG. 4.

The opening and closing movement of the first inner structure section 110 may be tied to the opening and closing movement of the first outer structure section 46 given the configuration of the first door deployment linkages 84. By contrast, the opening and closing movement of the second inner structure section 156 may be independent of the opening and closing movement of the first outer structure section 46 given the configuration of the second door deployment linkages 120 (see FIGS. 8 and 9). This may in turn facilitate simplified access to the engine core 158 and/or components mounted to the engine core 158 while still providing a single bifurcation bypass flowpath 44; e.g., an O-duct bypass flowpath opposed to a D-duct or a C-duct bypass flowpath.

FIGS. 10A-D illustrate a sequence for accessing the engine core 158 of the aircraft propulsion system 20. Referring to FIG. 10A, the outer latches 60 are unlatched to uncouple the first outer structure section 46 from the second outer structure section 48. Referring to FIG. 10B, the second outer structure section 48 may then be pivoted to its open position using, for example, ground support equipment (GSE) (not shown). Once the second outer structure section 48 is open, maintenance personnel may have easier access to the inner latches 180. These inner latches 180 are unlatched to uncouple the first inner structure section 110 from the second inner structure section 156. Referring to FIG. 10C, the second inner structure section 156 may then be pivoted to its open position using, for example, the ground support equipment. Referring to FIG. 10D, the first outer structure section 46 also with the linked first inner structure section 110 may then be pivoted to their open position using, for example, the ground support equipment. This process may then be reversed to close and then secure the members.

While the first thrust reverser system 74 is described above as an exposed link thrust reverser and the second thrust reverser system 112 is described above as a hidden link thrust reverser, the present disclosure is not limited to such an exemplary arrangement. The thrust reverser systems, for example, may be configured as any type of thrust reverser systems with different configurations; e.g., different types of door deployment linkages. For example, in other embodiments, both the first thrust reverser system 74 and the second thrust reverser system 112 may be configured as hidden link thrust reverser systems where those thrust reverser systems include different door deployment linkage arrangements. Various other arrangements of door deployment linkages are disclosed in U.S. Pat. Nos. 9,518,534; 10,655,564; 10,794,328; 11,719,190; 11,835,015; and 11,859,578, each of which is incorporated by reference in its entirety. The present disclosure, of course, is not limited to such alternative thrust reverser system arrangements.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   a first thrust reverser system including a first thrust reverser passage, a first blocker door and a first door deployment linkage pivotally coupled to the first blocker door, the first thrust reverser system configured to move the first blocker door from a first door stowed position to a first door deployed position using the first door deployment linkage, the first blocker door located radially outboard of a bypass flowpath relative to an axis when the first blocker door is in the first door stowed position, and the first blocker door configured to redirect a first portion of air flowing in the bypass flowpath through the first thrust reverser passage when the first blocker door is in the first door deployed position; and
   a second thrust reverser system including a second thrust reverser passage, a second blocker door and a second door deployment linkage pivotally coupled to the second blocker door, the second thrust reverser system configured to move the second blocker door from a second door stowed position to a second door deployed position using the second door deployment linkage, the second blocker door located radially outboard of the bypass flowpath relative to the axis when the second blocker door is in the second door stowed position, the second blocker door configured to redirect a second portion of the air flowing in the bypass flowpath through the second thrust reverser passage when the second blocker door is in the second door deployed position, and the second door deployment linkage having a different configuration than the first door deployment linkage;
   wherein the second blocker door is circumferentially offset from the first blocker door about the axis;
   wherein the first blocker door forms a first outer peripheral boundary of a first portion of the bypass flowpath when the first blocker door is in the first door stowed position; and
   wherein the second blocker door forms a second outer peripheral boundary of a second portion of the bypass flowpath when the second blocker door is in the second door stowed position.

2. The assembly of claim 1, wherein the second blocker door is axially aligned with the first blocker door along the axis.

3. The assembly of claim 1, wherein
   the first thrust reverser system is configured as an exposed link thrust reverser system; and
   the second thrust reverser system is configured as a hidden link thrust reverser system.

4. The assembly of claim 1, wherein the first door deployment linkage extends radially across the bypass flowpath when the first blocker door is in the first door stowed position.

5. The assembly of claim 1, wherein the first door deployment linkage is further pivotally coupled to an inner fixed structure radially inboard of the bypass flowpath relative to the axis.

6. The assembly of claim 1, wherein
   the first door deployment linkage is pivotally coupled to the first blocker door an outer pivot point that moves along the axis as the first blocker door moves from the first door stowed position to the first door deployed position; and
   an inner pivot point of the first door deployment linkage is stationary as the first blocker door moves from the first door stowed position to the first door deployed position.

7. The assembly of claim 6, wherein the first door deployment linkage consists of a single link.

8. The assembly of claim 1, wherein at least one of
   the first door deployment linkage is disposed outside of the bypass flowpath when the first blocker door is in the first door stowed position; or
   the second door deployment linkage is disposed outside of the bypass flowpath when the second blocker door is in the second door stowed position.

9. The assembly of claim 1, wherein the second door deployment linkage is further pivotally coupled to a fixed structure radially outboard of the bypass flowpath relative to the axis.

10. The assembly of claim 1, wherein
    the second door deployment linkage is pivotally coupled to the second blocker door at a downstream pivot point that moves along the axis as the second blocker door moves from the second door stowed position to the second door deployed position; and
    an upstream pivot point of the second door deployment linkage is stationary as the second blocker door moves from the second door stowed position to the second door deployed position.

11. The assembly of claim 10, wherein
    the second door deployment linkage includes a first link and a second link;
    the first link is pivotally coupled to the second blocker door at the downstream pivot point; and
    the second link includes the upstream pivot point.

12. The assembly of claim 11, wherein the first link is pivotally coupled to the second link.

13. The assembly of claim 1, further comprising:
    a stationary structure; and
    a nacelle outer structure including a first outer structure section and a second outer structure section;
    the first outer structure section disposed to a first side of the stationary structure and pivotally coupled to the stationary structure, and the first outer structure section configured with the first thrust reverser system; and
    the second outer structure section disposed to a second side of the stationary structure and pivotally coupled to the stationary structure, and the second outer structure section configured with the second thrust reverser system.

14. The assembly of claim 13, wherein the stationary structure comprises a pylon for mounting the aircraft propulsion system to an airframe of an aircraft.

15. The assembly of claim 13, wherein
    the first outer structure section extends circumferentially about the axis away from the stationary structure to a first end of the first outer structure section;
    the second outer structure section extends circumferentially about the axis away from the stationary structure to a second end of the second outer structure section; and
    the first end of the first outer structure section is attached to the second end of the second outer structure section by a latch.

16. An assembly for an aircraft propulsion system, comprising:

a stationary structure;

a nacelle outer structure including a first outer structure section and a second outer structure section, the first outer structure section disposed to a first side of the stationary structure and pivotally coupled to the stationary structure, the first outer structure section configured with a first thrust reverser system, the second outer structure section disposed to a second side of the stationary structure and pivotally coupled to the stationary structure, and the second outer structure section configured with a second thrust reverser system; and a nacelle inner structure including a first inner structure section and a second inner structure section, the first inner structure section disposed to the first side of the stationary structure and pivotally coupled to the stationary structure, the first inner structure section linked to the first outer structure section by the first thrust reverser system, the second inner structure section disposed to the second side of the stationary structure and pivotally coupled to the stationary structure, and the second inner structure section decoupled from the second thrust reverser system.

\* \* \* \* \*